INVENTORS
RICHARD G. BOWLER &
ROBERT E. MILLER

BY *E. Frank McKinney*

*Kenneth G. Wheeless*

THEIR ATTORNEYS

United States Patent Office

3,466,184
Patented Sept. 9, 1969

3,466,184
RECORD SHEET SENSITIZED WITH PHENOLIC POLYMERIC MATERIAL
Richard G. Bowler and Robert E. Miller, Dayton, Ohio, assignors to The National Cash Register Company, Dayton, Ohio, a corporation of Maryland
Filed Feb. 14, 1967, Ser. No. 616,065
Int. Cl. D21h 1/28
U.S. Cl. 117—36.2                               1 Claim

ABSTRACT OF THE DISCLOSURE

This invention relates especially to a paper copy-receiving sheet having the nap fibers protruding from a surface thereof clothed in a phenolic polymeric film material investment which is individual to each fiber and may extend in broken festoon-fashion from fiber to fiber, leaving a more or less capillarily porous sheet structure receptive of marking (printing) liquids.

---

Figure 1:
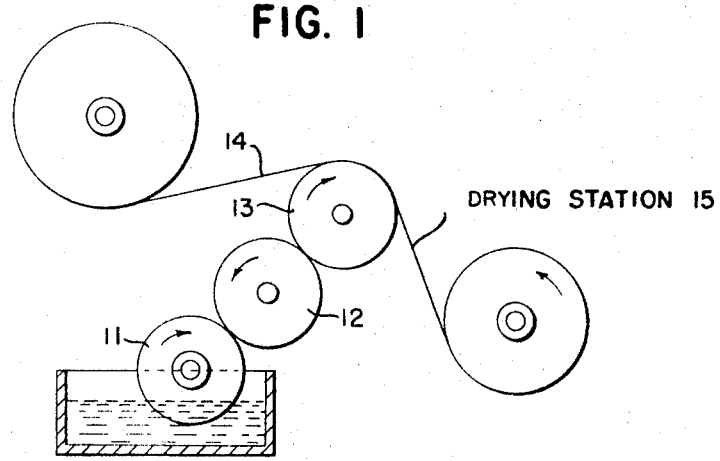

The invention relates to such a copy-receiving sheet for use in developing, by chemical contact with the film material, a distinctive color in an applied liquid marking fluid, said liquid normally being of a light or colorless nature and developing a strong distinctive color when it comes into contact with the mentioned phenolic polymeric film material by reason of a chemical reaction.

The significance of this invention is in the provision of the phenolic film material in a given area in such a fibrous structure in such distribution that a small amount thereof gives a great contact area with applied liquid marking fluid, so that the reaction can occur swiftly and intensely for the small amount of materials employed per unit area. In such phenolic polymeric material-sensitized paper a color reaction can be made to occur by reason of its acidic properties, which are more available if the phenolic material is dissolved rather than remaining undissolved by the applied marking liquid. Quick and complete solubility is desirable and large surface area of contact per unit area of the record material surface is mandatory for quick, complete, and intense response. This invention utilizes the broken nappy fibrous surface of the paper, instead of covering it up in an unbroken film of polymeric material, by covering only the extending fibers by a judiciously selected small amount of applied sensitizing material The history of such color reactant sensitized copy-receiving sheets is largely associated with the use of fine particles of attapulgite and acidic-clay as the large surface area providing sensitizing medium, such being employed in the "NCR" paper, which is commercially manufactured and used in large quantities at the present time all over the world. This invention substitutes, in a most efficient form, for the attapulgite particles, or like clay particles, the acidic phenolic film material in the form of a discontinuous coating on and between the nap fibers of the paper sheet, which coating does not occlude or render ineffective the natural porous absorption characteristics of paper for applied inks and preserving the large surface area naturally afforded by an uncoated fibrous surface.

It is to be understood that while the combination of the mentioned microscopic capsules retaining reactant marking liquid and acid-reactant materials provided together on the same sheet to form an autogenous system is not new, the aspect of a novel architecture for the acidic-polymeric material invested on and between the nap fibers of paper so as to provide a harbor for such capsules in protective embrace against premature rupture or damage is considered to be a new improvement which is in itself an invention properly considered as an extension of the simple embodiments. For previous systems of capsules and acid-reactant materials together on the same sheet to make a pressure-sensitive recording system, see U.S. Patent No. 2,730,457, which issued Jan. 10, 1956, on the application of Barrett K. Green et al. More recent progress in this field has been evidenced in other United States patent applications which have issued as patents; for instance, in U.S. Patent No. 3,179,600, which issued Apr. 20, 1965, on the application of Bruce W. Brockett, which discloses the use of microscopic oil-containing capsules charged with colorless color-reactant liquid material and having coated on their outside surfaces, individually, silica particles which render any such capsule capable of making a mark, upon its rupture, by reason of the action between the contained liquid material and the silica on its outside, forming a color. Paper coated with these capsules can be marked upon by pressure stylus or other pressure recording instrument to make colored marks, but, of course, this invention provides a different architectural construction and constitutes a novel pressure sensitive system. Capsules may be made according to those described in U.S. Patent No. 2,800,457, which issued July 23, 1957, on the application of Barrett K. Green and Lowell Schleicher, and distributed in the novel phenolic polymeric material dried coating, either with an as part of the coating as applied or after it has been applied either before or after the coating has set to a solid by solvent evaporation.

This invention relies mainly on the discontinuous nature of the coating, even though made of phenolic polymeric film-forming material, the discontinuity being in its "rough" texture as distinguished from the "smooth" texture of a varnish type printed film, the discontinuity being furnished by the nap fiber disposition and attitude, and by the open surface interstitial porosity following the natural capillary formations in the paper surface.

The invention is largely concerned with the use of a low-viscosity, low-concentration printing sensitizing solution which has the property of lightly investing the nap fibers of sheet paper each with a film without forming an unbroken varnish-like film masking the natural felted porosity of the sheet, which is so valuable an asset in taking on and holding in place applied liquid inks.

It is contemplated that the sensitizing solution used have a viscosity of something less than water viscosity and that the applied solution be of such quantity and concentration, and with such solvent volatility, that, once applied, the solvent evaporates and leaves a nearly undetectable residue, which, though of small amount and weight with relation to the paper, is extremely effective because of its architectural relationship as an investment on and between the individual fibers.

A mode of use of the polymeric material solution of this invention is to apply it by rubber printing plates with an intermediate feeder roll and a supply roll dipping into a tank of the solution onto a continuous run of paper, which is then passed over a drying station and wound on a receiving roll. A dried weight of about 0.02 pound of phenolic resin to 0.6 pound per ream of paper of 24 by 36 inches by 500 sheets is adequate for developing marks in a solution of 1.5%, by weight, crystal violet lactone dissolved in an inert oil to make up a colorless ink. To illustrate the way of applying this phenolic polymeric film material in the best known manner, as now known, reference is made to FIGURE 1 of the drawings, which shows, in diagrammatic form, a flexographic printing unit with a sheet of paper being passed therethrough and wound onto a take-up roll. The sensitizing solution of Example I is used, and an amount of about 2 pounds per ream of paper is applied, which, when dried, yields a dry weight of 0.02 pound to 0.6 pound of phenolic resin per ream. The ink is held in a pan 10, in which a roller supply means 11 is turned, said roller supply means 11 being in roller contact with a middle evening roll 12 and a printing roll 13, which contacts the paper sheet 14, traveling in the direction of the arrow. A drying station 15 is indicated by the legend "Drying Station," and here any suitable means may be used to apply heat conductively by hot body or by hot gas to the coating to facilitate fast drying thereof.

Figure 2:
Figure 6:
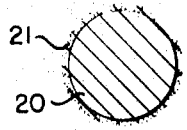

FIGURE 2 shows a cross-section of a typical sheet of paper indicating the felting of fibers 20 individually surface coated with the dried phenolic material 21, which extends in festoon-like fashion between the fibers (see FIGURE 4) but does not materially close or fill the capillary interstices therebetween. The cross-sectional (FIGURE 2) of the sheet, while not drawn to exact scale, which would be impossible because of the relative thinness of the coating relative to the thickness of the sheet, gives an idea of how the structure in so discontinuous (see also FIGURE 4) as to afford lodging places of great surface area for the applied phenolic solution, so as to assist in the solution of the dried phenolic material and the bring about of a color reaction when the colorless ink is applied. The festooning of the phenolic polymeric film also affords protection for absorbed printing ink and the colored liquid prints made therefrom. FIGURES 5 and 6 are details of coated fibers in elevation and cross-section, respectively.

Figure 3:
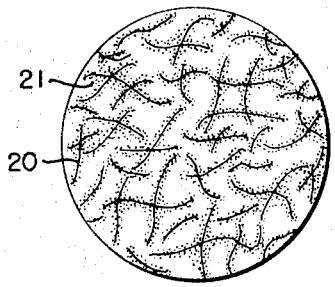
Figure 4:
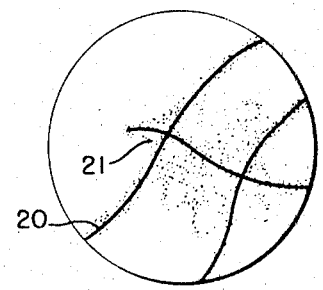
Figure 5:
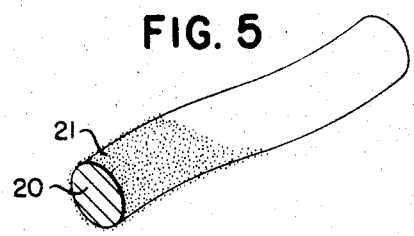

FIGURE 3 is a magnified diagrammatic view of a portion of the paper fibers as invested with the polymeric film material, and FIGURE 4 is an enlargement of a portion of FIGURE 3, showing the festooning of the interfiber polymeric material. FIGURES 5 and 6 are, respectively, a cross-section and an elevation of an individual fiber invested with polymeric material according to the invention.

Therefore, not only is the novel record material efficient in that only a small amount of polymeric material is needed, thus not interfering to any great degree with the normal quality of the paper as to feel, but it is present in its most efficient form as far as contact area per square unit of paper surface is concerned, and gives more-than-adequate provision for the making of an intensely colored mark with the least amount of applied printing liquid equivalent to or better than that now known for ordinary color-reaction types of printing sheets.

The invention having been described with reference to just the presence of phenolic polymeric material thereon, it is to be understood that it is within the scope of the invention to add other materials to the coating to take advantage of its novel construction, and among such additional materials may be the before-mentioned microscopic capsules, which themselves contain, in liquid form, a colorless "ink" and which, by their presence in intimate relation to the phenolic material, will yield, upon the application of pressure, a mark without the application of "ink" from an outside source, by the act of making an impression, thus making the paper autogenous with respect to reacting to "stylus" pressure, which pressure exemplifies printing without the use of an ink, and such might also be induced by the striking of type or any other printing member against the sensitized material.

The acidic phenolic polymeric materials useful in this invention include oil-soluble phenol aldehyde polymers and phenol acetylene polymers.

Among the phenolic polymers found useful are paraphenyl phenols and alkyl-phenol-acetylene resins, which are soluble in common organic solvents and possess permanent fusibility in the absence of being treated by crosslinking materials. A specific group of useful phenol-aldehyde polymers are members of the type commonly referred to as "novolacs," (as sold by Union Carbide Corp., New York, N.Y.) which are characterized by solubility in common organic solvents and which are, in the absence of cross-linking agents, permanently fusible. Generally, the phenolic polymer material found useful in practicing this invention is characterized by the presence of free hydroxyl groups and the absence of groups such as methylol, which tend to promote infusibility or crosslinking of the polymer, and by their solubility in organic solvents and relative insolubility in aqueous media. Again, obviously, mixtures of these phenolic polymers can be employed.

Resoles, if they are still soluble, may be used, though subject to change in properties upon aging.

A laboratory method useful in the selection of suitable phenolic resins is the determination of the infra-red absorption pattern. It has been found that phenolic resins showing an absorption in the 3200–3500 cm.$^{-1}$ region (which is indicative of the free hydroxyl groups) and not having an absorption in the 1600–1700 cm.$^{-1}$ region are suitable. The latter absorption region is indicative of the desensitization of the hydroxyl groups and, consequently, makes such groups unavailable for reaction with the chromogenic materials.

The preparation of phenolic formaldehyde polymeric materials for practicing this invention is described in "Industrial and Engineering Chemistry," vol. 43, pages 134 to 141, January 1951, and a particular polymer thereof is described in Example 1 of U.S. Patent No. 2,052,093, issued to Herbert Hönel on Aug. 25, 1936, and the preparation of the phenol-acetylene polymers is described in "Industrial and Engineering Chemistry," vol. 41, pages 73 to 77, January, 1949.

Solvents for these phenolic materials are ordinary organic solvent materials of relatively great volatility and of low toxicity, among which are the following: normal butanol, ethanol, hexane, heptane, toluene, xylene, ethylene glycol monomethyl ether, ethylene glycol monoethyl ether, ethylene glycol diacetate, ethylene glycol dibutyl ether, ethylene glycol dimethyl ether, ethylene glycol monoacetate, ethylene glycol monobenzyl ether, ethylene glycol monobutyl ether (2-butoxyethanol), ethylene glycol monoethyl ether acetate, ethylene glycol monomethyl ether acetate, ethylene glycol monophenyl ether, and ethyl acetate. The foregoing solvents also act to adjust the viscosity of the ink.

It is to be understood that the solvents described above are to be used in applying the phenolic material and are not necessarily used as a solvent vehicle to facilitate reactive contact between colorforming components. In the latter instance, the liquid solvent must be capable of dissolving both of the mark-forming components. The solvent chosen should be capable of dissolving at least 0.03%, on a weight basis, of the chromogenic material, and a corresponding amount of polymeric material to form an efficient reaction. However, in the preferred system, the solvent should be capable of dissolving an excess of the polymeric material, so as to provide every opportunity for utilization of the chromogenic material and, thus, to assure the maximum coloration at a reaction site.

The preferred embodiment of the paper-sensitizing solution of this invention comprises a phenolic polymer in a solvent or a mixture of solvents. The phenolic polymer can comprise from 5% to 60%, by weight, of the solution.

EXAMPLE I

A specific example of a multi-solvent composition is set forth as follows:

| | Percentage by weight of solution |
|---|---|
| Phenolic resin | 29.8 |
| Ethylene glycol monoethyl ether | 2.6 |
| Ethylene glycol monomethyl ether | 14.8 |
| Normal butanol | 14.8 |
| Ethyl acetate | 19.0 |
| Ethyl alcohol | 19.0 |
| | 100.0 |

The paper upon which the phenolic resin solution is printed can be any medium calendered paper as well as bond paper, juted sheets and the like.

The architecture of the discontinuous coating depends on a relation between the applied solution and the base paper stock used, the latter having more or less nap fibers extending according to its constitution, and the viscosity, drying character, film-forming properties of the solution all creating variables that require empirical examination of every pair—paper and coating solution—used together under existing manufacturing conditions. The relative amounts of materials used for a given pair in a manufacturing run can adequately be determined by microscopic examination of the physical result—the objective being to have the dried coating solution cover the exposed nap fibers lightly with some slight festooning between the fibers to form a receptive aborescent haven for applied printing liquid to provide maximum surface contact of printing liquid and dried coating per unit of printing area.

Among the modes of application of the coating solution that can be used are spraying, light spreader, bar or blade coating, light brushing, or any other mode of application where controlled amounts can be applied.

What is claimed is:
1. An acid-reactant-sensitized sheet of paper for developing color in a base-reacting colorless printing liquid applied thereto by expression of droplets retained by pressure-rupturable wall material located in the sensitized sheet or in an overlying sheet placed against the sensitized sheet, said sensitized sheet being characterized by having its surface fibers individually and lightly invested with acidic-phenolic polymeric film material in an amount of 0.02 to 0.6 pound per ream of 24 by 36 inches by 500 sheets, said phenolic polymeric film material being further characterized by ready solubility in the colorless printing liquid, by being a dried residue of a solution of said phenolic polymeric film material in a readily-evaporable organic solvent, and by its distribution substantially on the individual surface fibers so as to form a discontinuous film that does not occlude the natural inter-fiber porous spaces and to leave the paper surface receptive to said colorless printing liquid.

References Cited
UNITED STATES PATENTS

| | | | |
|---|---|---|---|
| 2,757,085 | 7/1956 | Paquin | 117—36.2 |
| 3,244,548 | 4/1966 | Sullivan | 117—36.2 |

FOREIGN PATENTS 428,386  5/1935  Great Britain.

MURRAY KATZ, Primary Examiner

U.S. Cl. X.R.

117—36.8, 155

UNITED STATES PATENT OFFICE
Certificate

Patent No. 3,466,184　　　　　　　　　　　　　　　　　　Patented September 9, 1969

Richard G. Bowler and Robert E. Miller

Application having been made by Richard G. Bowler and Robert E. Miller, the inventors named in the patent above identified, and The National Cash Register Company, Dayton, Ohio, a corporation of Maryland, the assignee, for the issuance of a certificate under the provisions of Title 35, Section 256, of the United States Code, deleting the name of Richard G. Bowler as a joint inventor, and a showing and proof of facts satisfying the requirements of the said section having been submitted, it is this 18th day of December 1973, certified that the name of the said Richard G. Bowler is hereby deleted from the said patent as a joint inventor with the said Robert E. Miller.

FRED W. SHERLING
*Associate Solicitor.*